United States Patent
Liu et al.

(10) Patent No.: US 11,621,437 B2
(45) Date of Patent: Apr. 4, 2023

(54) ELECTROLYTE AND ELECTROCHEMICAL DEVICE

(71) Applicant: NINGDE AMPEREX TECHNOLOGY LIMITED, Ningde (CN)

(72) Inventors: Jianyu Liu, Ningde (CN); Jianming Zheng, Ningde (CN); Qian Wen, Ningde (CN); Wenqiang Li, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 239 days.

(21) Appl. No.: 16/962,422

(22) PCT Filed: Feb. 14, 2020

(86) PCT No.: PCT/CN2020/075342
§ 371 (c)(1),
(2) Date: Jul. 15, 2020

(87) PCT Pub. No.: WO2021/103320
PCT Pub. Date: Jun. 3, 2021

(65) Prior Publication Data
US 2021/0408594 A1 Dec. 30, 2021

(30) Foreign Application Priority Data
Nov. 29, 2019 (CN) .......................... 201911201346.7

(51) Int. Cl.
H01M 10/0567 (2010.01)
H01M 10/42 (2006.01)
H01M 4/62 (2006.01)
H01M 10/0525 (2010.01)
H01M 4/02 (2006.01)

(52) U.S. Cl.
CPC ... *H01M 10/0567* (2013.01); *H01M 10/4235* (2013.01); *H01M 4/623* (2013.01); *H01M 10/0525* (2013.01); *H01M 2004/021* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | | | |
|---|---|---|---|---|
| 8,455,143 B2 * | 6/2013 | Lee | | H01M 10/0567 429/339 |
| 2006/0236528 A1* | 10/2006 | Xu | | H01M 10/0568 29/623.1 |
| 2013/0266847 A1 | 10/2013 | Noguchi et al. | | |
| 2014/0349196 A1* | 11/2014 | Ward | | H01M 10/0565 29/623.5 |
| 2015/0249271 A1* | 9/2015 | Choi | | H01M 10/0567 429/326 |

FOREIGN PATENT DOCUMENTS

| CN | 101057355 A | 10/2007 |
|---|---|---|
| CN | 102037600 A | 4/2011 |
| CN | 101188314 B | 10/2012 |
| CN | 104704657 A | 6/2015 |
| CN | 106165182 A | 11/2016 |
| CN | 106207262 A | 12/2016 |
| CN | 107359367 A | 11/2017 |
| CN | 108123175 A | 6/2018 |
| CN | 109390629 A | 2/2019 |
| CN | 109411814 A | 3/2019 |
| CN | 110444815 A | 11/2019 |
| JP | 6054023 B2 | 5/2012 |
| JP | 2014165037 A | 9/2014 |
| JP | 2015522915 A | 8/2015 |
| JP | 2016173987 A | 9/2016 |
| KR | 20080108043 A | 12/2008 |
| KR | 20140066050 A | 5/2014 |
| KR | 20150027073 A | 3/2015 |
| WO | 2016209844 A2 | 12/2016 |

OTHER PUBLICATIONS

Chinese First Office Action dated Sep. 18, 2020 in counterpart Chinese application 201911201346.7, 7 pages.
Korean Second Office Action dated Jul. 28, 2022 in counterpart Korean application 10-2020-7012656, 5 pages in Korean.
Korean First Office Action dated Mar. 27, 2022 in counterpart Korean application 10-2020-7012656, 5 pages in Korean.
Japanese First Office Action dated Mar. 8, 2022 in counterpart Japanese application 2020-518530, 3 pages in Japanese.

* cited by examiner

*Primary Examiner* — Anca Eoff
(74) *Attorney, Agent, or Firm* — Juan Carlos A. Marquez; Marquez IP Law Office, PLLC

(57) ABSTRACT

An electrolyte, including a fluorine-containing phosphate ester and a carboxylate ester, wherein the fluorine-containing phosphate ester is represented by Formula 1:

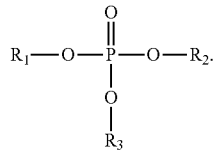

Formula 1

$R_1$, $R_2$ and $R_3$ are each independently selected from hydrogen, a $C_1$-$C_{10}$ alkyl group, $C_1$-$C_{10}$ alkoxy group, $C_1$-$C_{10}$ haloalkyl group, $C_1$-$C_{10}$ haloalkoxy group, $C_1$-$C_{10}$ phosphate ester group, or $C_1$-$C_{10}$ mono- or multiple-carbonate ester group, wherein at least one of $R_1$, $R_2$ and $R_3$ comprises a fluorine atom. The weight ratio of the fluorine-containing phosphate ester to the carboxylate ester is 0.001-0.5.

9 Claims, No Drawings

ELECTROLYTE AND ELECTROCHEMICAL DEVICE

The present application is a National Stage application of PCT international application: PCT/CN2020/075342, filed on 14 Feb. 2020 which claims the benefit of priority from China Patent Application No. 201911201346.7, filed on 29 Nov. 2019, the disclosure of which is hereby incorporated by reference in its entirety.

BACKGROUND OF THE INVENTION

1. Field of the Invention

The present application relates to the technical field of energy storage technologies, and more particularly to an electrolyte and an electrochemical device.

2. Description of the Related Art

Lithium ion batteries have been widely used due to their advantages such as environmental friendliness, high operating voltage, large specific capacity and long cycle life, such that they have become a new green chemical power source with the most promising development prospect in the world. With the rapid development of the lithium battery industry, even the requirements for lithium-ion batteries, such as: lighter weight, thinner thickness, smaller volume and higher energy density are expected. However, with the further improvement of the energy density of lithium ion batteries, safety issues with lithium ion batteries have become notable.

SUMMARY OF THE INVENTION

The present application provides an electrolyte and an electrochemical device, to solve to some extent at least one of the problems existing in related art.

According to an embodiment of the present application, the present application provides an electrolyte including a fluorine-containing phosphate ester and a carboxylate ester. The fluorine-containing phosphate ester is represented by Formula 1 below:

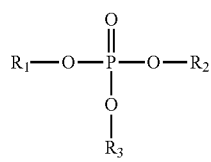

Formula 1 wherein $R_1$, $R_2$ and $R_3$ are each independently selected from hydrogen, a $C_1$-$C_{10}$ alkyl group, $C_1$-$C_{10}$ alkoxy group, $C_1$-$C_{10}$ haloalkyl group, $C_1$-$C_{10}$ haloalkoxy group, $C_1$-$C_{10}$ phosphate ester group, or $C_1$-$C_{10}$ mono- or multiple-carbonate ester group, wherein at least one of $R_1$, $R_2$ and $R_3$ includes a fluorine atom, and wherein the weight ratio of the fluorine-containing phosphate ester to the carboxylate is 0.001-0.5.

According to an embodiment of the present application, the fluorine-containing phosphate ester includes, in the electrolyte, at least one of

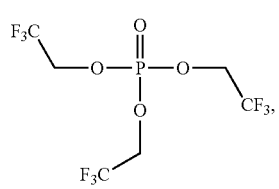

Formula 1-1

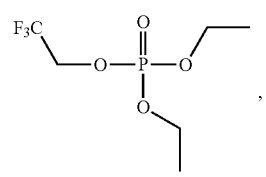

Formula 1-2

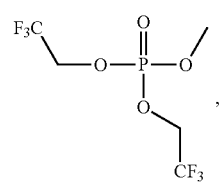

Formula 1-3

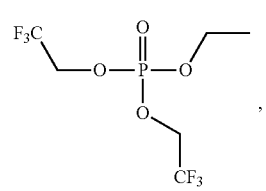

Formula 1-4

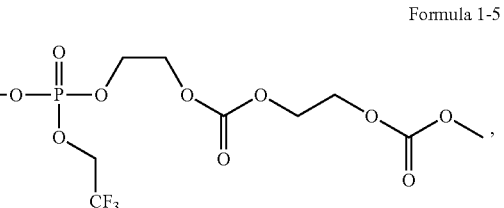

Formula 1-5

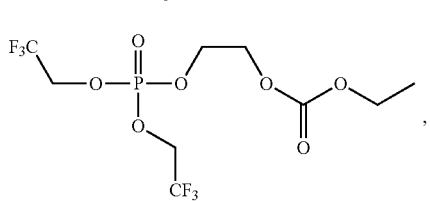

Formula 1-6

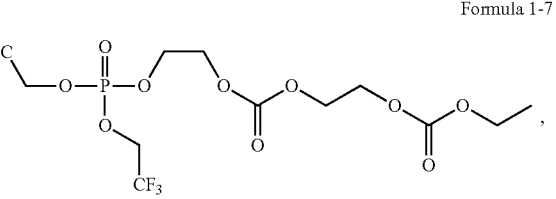

Formula 1-7

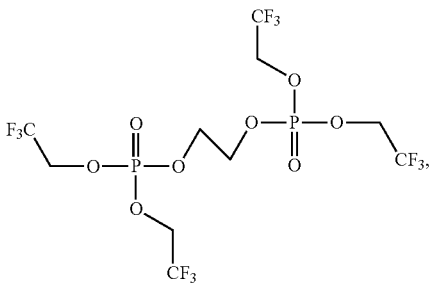

Formula 1-8

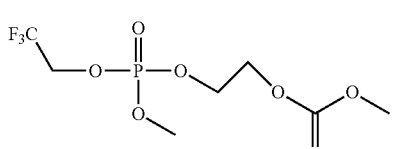

Formula 1-9

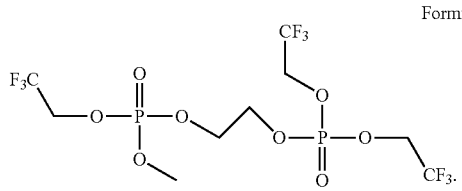

Formula 1-10

According to an embodiment of the present application, the carboxylate ester includes, in the electrolyte, at least one of methyl propionate, ethyl acetate, ethyl propionate, propyl propionate, methyl butyrate, ethyl butyrate, propyl butyrate or butyl butyrate.

According to an embodiment of the present application, the weight percentage of the carboxylate ester in the electrolyte is 80% or less based on a total weight of the electrolyte.

According to an embodiment of the present application, the weight percentage of ethyl propionate in the electrolyte is 10%-90% based on a total weight of the carboxylate ester.

According to an embodiment of the present application, the weight percentage of the fluorine-containing phosphate ester in the electrolyte is 0.01%-10% based on a total weight of the electrolyte.

According to an embodiment of the present application, the weight percentage of the fluorine-containing phosphate ester in the electrolyte is 0.5%-7% based on a total weight of the electrolyte.

According to an embodiment of the present application, the electrolyte further includes at least one of a boron compound or a phosphazene compound. The boron compound includes at least one of lithium bis(1,1-trifluoromethyloxalato)borate, lithium bis(1-trifluoromethyloxalato)borate, lithium difluoro(1,1-trifluoromethyloxalato)borate, lithium difluoro(oxalato)borate, lithium bis(oxalato)borate, lithium bis(1,1-trifluoromethylmalonato)borate, lithium fluoromalonato(difluoro)borate, or lithium bis(fluoromalonato)borate. The phosphazene compound includes at least one of:

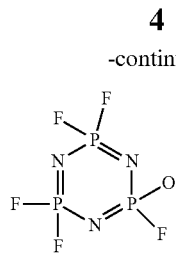

Formula 2-1

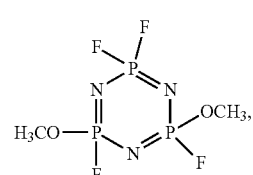

Formula 2-2

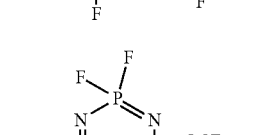

Formula 2-3

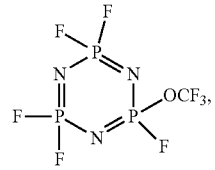

Formula 2-4

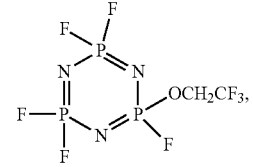

Formula 2-5

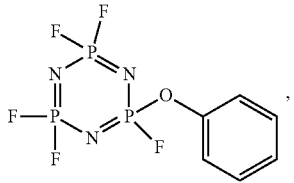

Formula 2-6

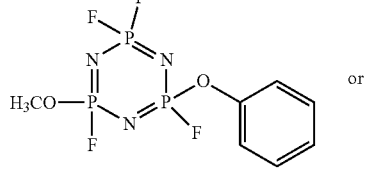

Formula 2-7

Formula 2-8

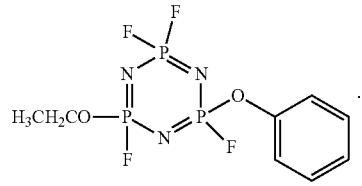

or

Formula 2-9

According to an embodiment of the present application, the weight percentage of the boron compound in the electrolyte is 0.01%-5% based on a total weight of the electrolyte.

According to an embodiment of the present application, the weight percentage of the phosphazene compound in the electrolyte is 0.1%-10% based on a total weight of the electrolyte.

According to an embodiment of the present application, the weight percentage of the boron compound and the phosphazene compound in the electrolyte is 01%-10% based on a total weight of the electrolyte.

According to an embodiment of the present application, the present application further provides an electrochemical device, which includes: a cathode, having a cathode active material layer including a cathode active material; an anode, having an anode active material layer including an anode active material; and any electrolyte as described above.

According to an embodiment of the present application, the electrochemical device meets $2.7 \leq (D90-D10)/D50 + Cw/D50 + D \times 14R/10000 \leq 8.0$, wherein D10 (μm) is a numerical value of the particle size when the cumulative volume percentage of the cathode active material reaches 10%, D90 (μm) is a numerical value of the particle size when the cumulative volume percentage of the cathode active material reaches 90%, and D50 (μm) is a numerical value of the particle size when the cumulative volume percentage of the cathode active material reaches 50%, wherein Cw (mg/cm$^2$) is a numerical value of the weight of the cathode active material layer per unit area, wherein D (g/cm$^3$) is a numerical value of the compacted density of the cathode, and wherein R (g/cm$^3$) is a numerical value of the density of the electrolyte.

According to an embodiment of the present application, in the electrochemical device, (D90-D10)/D50 is in the range of 0.3-6.0.

According to an embodiment of the present application, in the electrochemical device, the density R of the electrolyte is in the range of 0.7-1.5.

According to an embodiment of the present application, in the electrochemical device, the cathode includes a binder that includes polyvinylidene fluoride having a molecular weight distribution Mw/Mn of greater than 1.8.

According to an embodiment of the present application, in the electrochemical device, the cathode active material includes at least one of lithium cobalt oxide, lithium nickel oxide, lithium manganese oxide, lithium nickel cobalt manganese composite oxide or lithium nickel cobalt aluminum composite oxide.

According to an embodiment of the present application, in the electrochemical device, the weight ratio of the lithium cobalt oxide to the lithium nickel cobalt aluminum composite oxide in the cathode active material is 9:1-1:9.

According to an embodiment of the present application, in the electrochemical device, the weight ratio of the lithium cobalt oxide to the lithium nickel cobalt aluminum composite oxide in the cathode active material is 3:7-7:3.

Additional aspects and advantages of the embodiments of the present application will be described or shown in the following description or interpreted by implementing the embodiments of the present application.

DETAILED DESCRIPTION

The embodiments of the present application will be described in detail below. The embodiments of the present application should not be interpreted as limitations to the present application.

As used in the present application, terms "approximately", "substantially", "essentially", and "about" are used for describing and explaining a small variation. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two numerical values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "substantially" the same.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The term "alkyl group" is intended to be a linear saturated hydrocarbon structure having 1 to 20 carbon atoms. The alkyl group is also intended to be a branched or cyclic hydrocarbon structure having 3 to 20 carbon atoms. For example, the alkyl group may be an alkyl group having 1 to 5 carbon atoms, an alkyl group having 1 to 10 carbon atoms, an alkyl group having 5 to 20 carbon atoms, or an alkyl group having 10 to 20 carbon atoms. When an alkyl group having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on. Additionally, the alkyl group can be optionally substituted. The term "fluoroalkyl group" refers to an alkyl group substituted with one or more fluorine atoms. The term "haloalkyl group" refers to an alkyl group substituted with one or more halogen atoms, which may be F, Cl, Br or I.

The term "alkoxy group" refers to the L-O— group, wherein L is an alkyl group. Herein, the alkoxy group may be an alkoxy group having 1 to 20 carbon atoms, an alkoxy group having 1 to 8 carbon atoms, an alkoxy group having 1 to 5 carbon atoms, an alkoxy group having 5 to 10 carbon atoms, or an alkoxy group having 5 to 20 carbon atoms. The term "fluoroalkoxy group" refers to an alkoxy group substituted with one or more fluorine atoms. The term "haloalkoxy group" refers to an alkoxy group substituted with one or more halogen atoms, which may be F, Cl, Br or I.

The term "carbonate ester group" refers to —R1-COO—R2, wherein R1 can be an alkylene group having 1-5 carbon atoms, and R2 can be hydrogen or an alkyl group having 1-5 carbon atoms, for example, —CH$_2$—COO—C$_2$H$_5$, —C$_2$H$_4$—COO—C$_2$H$_5$, —C$_2$H$_4$—COO—CH$_3$, or the like. The term "multiple-carbonate ester group" refers to a group having at least two carbonate ester groups, for example, —C$_2$H$_4$—COO—C$_2$H$_4$—COO—CH$_3$, —C$_2$H$_4$—COO—C$_2$H$_4$—COO—C$_2$H$_5$, or the like.

The term "phosphate ester group" refers to a phosphate ester group substituted with alkyl, for example, —C$_2$H$_4$—PO$_4$—(CH$_3$)$_2$, —C$_2$H$_4$—PO$_4$—(CF$_3$)$_2$, —C$_2$H$_4$—PO$_4$—(CH$_2$CF$_3$)$_2$, or the like.

The term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains from 2 to 20 carbon atoms, for example an alkenyl group having 6 to 20 carbon atoms, an alkenyl group having 2 to 10 carbon atoms or an alkenyl group having 2 to 6 carbon atoms. Representative alkenyl groups include (for example) ethenyl, n-propenyl, iso-propenyl, n-but-2-enyl, butyl-3-enyl, n-hex-3-enyl, and the like. Additionally, the alkenyl group can be optionally substituted.

The term "aryl group" encompasses both monocyclic and polycyclic systems. A polycyclic ring may have two or more rings where two carbons are shared by two adjacent rings (where the rings are "fused"), wherein at least one of the rings is aromatic and other rings may be for example, a cycloalkyl group, a cycloalkenyl group, an aryl group, a heterocyclyl group and/or a heteroaryl group. For example, the aryl group may be a C$_6$-C$_{20}$ aryl or C$_6$-C$_{10}$ aryl group. A representative aryl group includes (for example) phenyl, methylphenyl, propylphenyl, isopropylphenyl, benzyl and naphthalen-1-yl, naphthalen-2-yl and the like. Additionally, the aryl group can be optionally substituted. The term "haloaryl group" refers to an aryl group substituted with one or more halogen atoms, which may be F, Cl, Br or I.

The term "aryloxy group" refers to the L-O— group, wherein L is an aryl group. Herein, the aryloxy may be an aryloxy group having 6 to 20 carbon atoms, an aryloxy group having 6 to 10 carbon atoms, an aryloxy group having 6 to 12 carbon atoms, or an aryloxy group having 6 to 15 carbon atoms. The term "haloaryloxy group" refers to an aryloxy group substituted with one or more halogen atoms, which may be F, Cl, Br or I.

I. Electrolyte

The present application provides an electrolyte including a fluorine-containing phosphate ester and a carboxylate ester, wherein the weight ratio of the fluorine-containing phosphate ester to the carboxylate ester is about 0.001 to about 0.5. In some embodiments, the weight ratio of the fluorine-containing phosphate ester to the carboxylate ester is about 0.005, about 0.025, about 0.05, about 0.125, about 0.15, about 0.25, about 0.35, about 0.005-about 0.5, about 0.005-about 0.1, about 0.01-about 0.1, about 0.01-about 0.5, about 0.05-about 0.125, about 0.05-about 0.25, about 0.1-about 0.5, or the like.

Fluorine-Containing Phosphate Ester

In some embodiments, the fluorine-containing phosphate ester in the electrolyte is represented by Formula 1 below:

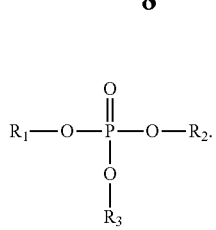

Formula 1

In Formula 1, $R_1$, $R_2$ and $R_3$ are each independently selected from hydrogen, a C$_1$-C$_{10}$ alkyl group, C$_1$-C$_{10}$ alkoxy group, C$_1$-C$_{10}$ haloalkyl group, C$_1$-C$_{10}$ haloalkoxy group, C$_1$-C$_{10}$ phosphate ester group, or C$_1$-C$_{10}$ mono- or multiple-carbonate ester group, wherein at least one of $R_1$, $R_2$ and $R_3$ includes a fluorine atom.

In some embodiments, $R_1$, $R_2$ and $R_3$ are each independently selected from C$_1$-C$_{10}$ fluoroalkyl group or C$_1$-C$_{10}$ fluoroalkoxy group.

In some embodiments, the fluorine-containing phosphate ester includes at least one of:

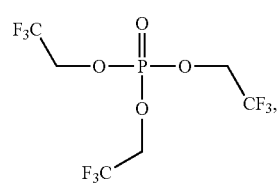

Formula 1-1

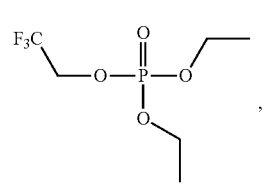

Formula 1-2

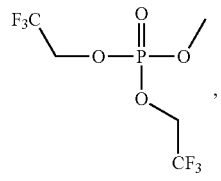

Formula 1-3

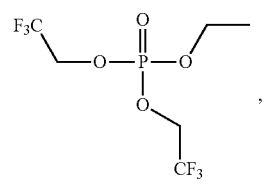

Formula 1-4

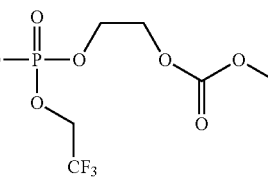

Formula 1-5

-continued

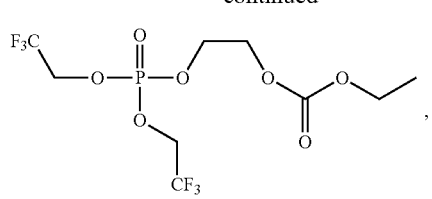
Formula 1-6

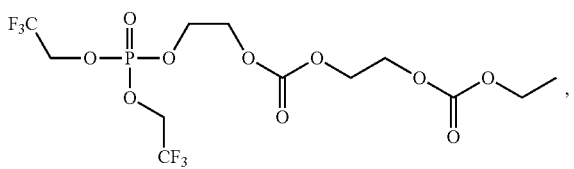
Formula 1-7

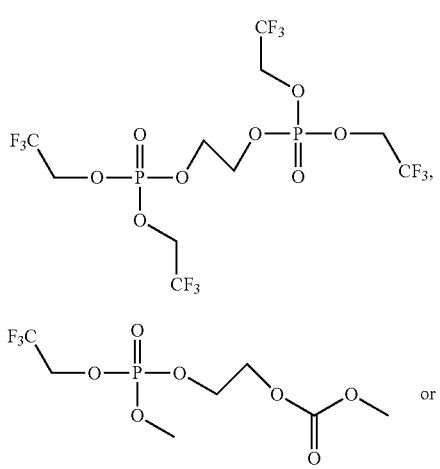
Formula 1-8

Formula 1-9

Formula 1-10

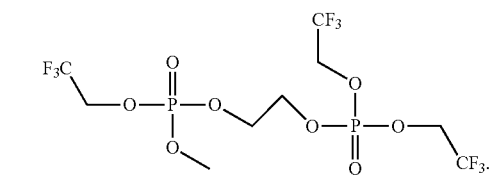

In some embodiments, the weight percentage of the fluorine-containing phosphate ester in the electrolyte is about 0.01%-about 10% based on a total weight of the electrolyte. In some embodiments, the weight percentage of the fluorine-containing phosphate ester in the electrolyte is about 0.5%-about 1%, about 0.5%-about 5%, about 0.5%-about 4%, about 0.5%-about 7%, about 1%-about 3%, about 1%-about 5%, about 1-about 7%, about 3%-about 7%, about 1%-about 10%, about 3%-about 5%, about 3%-about 10%, about 5%-about 10% or the like, based on a total weight of the electrolyte.

Carboxylate Ester

In some embodiments, the carboxylate ester in the electrolyte includes at least one of methyl propionate, ethyl acetate, ethyl propionate (EP), propyl propionate (PP), methyl butyrate, ethyl butyrate, propyl butyrate or butyl butyrate.

In some embodiments, the weight percentage of the carboxylate ester is about 80% or less based on a total weight of the electrolyte. Within this range, the electrochemical device has better kinetic performance, lithium plating is alleviated, and the degradation of the kinetic performance of the electrochemical device caused by the fluorine-containing phosphate ester is reduced. In some embodiments, the weight percentage of the carboxylate ester is about 70% or less, about 50% or less, about 40% or less, about 30% or less, about 20% or less, about 10% or less, about 10%-about 50%, about 10%-about 30%, about 20%-about 40%, about 30%-about 50%, about 30%-about 60%, about 50%-about 80% or the like, based on a total weight of the electrolyte.

In some embodiments, the carboxylate ester includes ethyl propionate, and based on a total weight of the carboxylate ester in the electrolyte, the weight percentage of ethyl propionate is about 10% to about 90%. When the weight percentage of ethyl propionate in the electrolyte is about 10%-about 90%, it can be guaranteed that the electrochemical device using a combination of the fluorine-containing phosphate ester and the carboxylate ester in the electrolyte has good kinetic performance. In some embodiments, the weight percentage of ethyl propionate is about 10%-about 30%, about 10%-about 50%, about 30%-about 60%, about 30%-about 50%, about 40%-about 60%, about 50%-about 75%, about 50%-about 90% or the like, based on a total weight of the carboxylate ester in the electrolyte.

Boron Compound

In some embodiments, the electrolyte of the present application may also include, in addition to the fluorine-containing phosphate ester and the carboxylate ester, a boron compound. The boron compound can inhibit the occurrence of side reactions with the fluoride-containing phosphate ester, thereby improving the electrochemical stability of the electrochemical device.

In some embodiments, the boron compound includes at least one of:

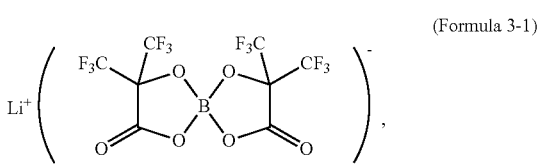
(Formula 3-1)

lithium bis(1,1-trifluoromethyloxalato)borate

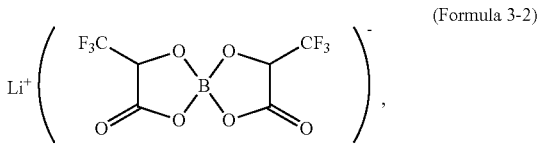
(Formula 3-2)

lithium bis(1-trifluoromethyloxalato)borate

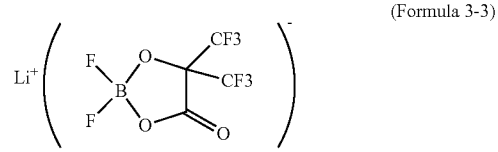
(Formula 3-3)

lithium difluoro(1,1-trifluoromethyloxalato)borate,

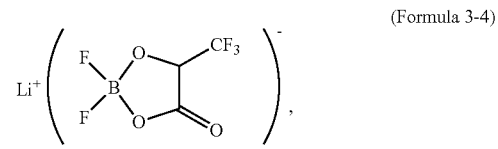
(Formula 3-4)

lithium difluoro(oxalato)borate

-continued

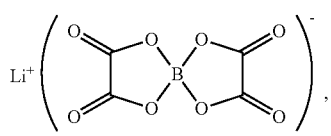
lithium bis(oxalato)borate (Formula 3-5)

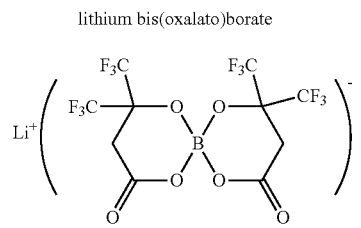
lithium bis(1,1-trifluoromethylmalonato)borate, (Formula 3-6)

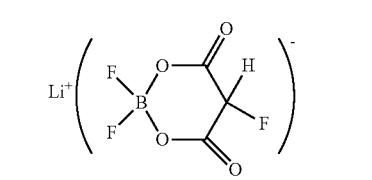
lithium fluoromalonato(difluoro)borate, or (Formula 3-7)

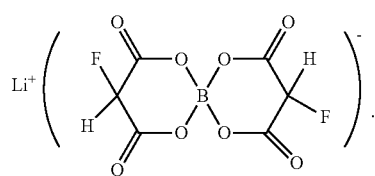
lithium bis(fluoromalonato)borate (Formula 3-8)

In some embodiments, the weight percentage of the boron compound in the electrolyte is about 0.01%-about 5% based on a total weight of the electrolyte. In some embodiments, the weight percentage of the boron compound is about 0.01%-about 0.1%, about 0.01%-about 1%, about 0.1%-about 1%, about 0.1%-about 0.3%, about 0.3%-about 0.5%, about 0.1%-about 5%, about 1%-about 5% or the like, based on a total weight of the electrolyte.

Phosphazene Compound

In some embodiments, the electrolyte of the present application may also include a phosphazene compound, in addition to the fluorine-containing phosphate ester and the carboxylate ester. The combination of the fluoride-containing phosphate ester, the carboxylate ester and the phosphazene compound can further improve flame retardancy, and reduce the amount of the fluoride-containing phosphate ester.

In some embodiments, the phosphazene compound is represented by Formula 2 below:

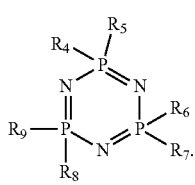

Formula 2

In Formula 2, $R_4$, $R_5$, $R_6$, $R_7$, $R_8$ and $R_9$ are each independently selected from a halogen atom, $C_1$-$C_{20}$ alkyl group, $C_1$-$C_{20}$ alkoxy group, $C_1$-$C_{20}$ haloalkyl group, $C_1$-$C_{20}$ haloalkoxy group, $C_2$-$C_{20}$ alkenyl group, $C_6$-$C_{20}$ aryl group, $C_6$-$C_{20}$ aryloxy group, $C_6$-$C_{20}$ haloaryl group, or $C_6$-$C_{20}$ haloaryloxy group. The halogen atom can be F, Cl, Br or I.

In some embodiments, the phosphazene compound is selected from at least one of:

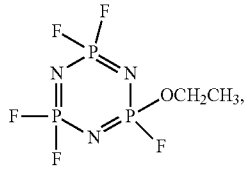
Formula 2-1

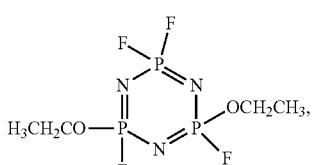
Formula 2-2

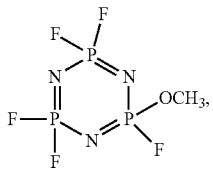
Formula 2-3

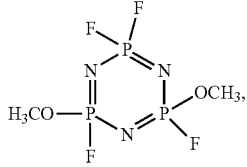
Formula 2-4

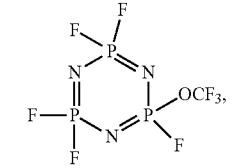
Formula 2-5

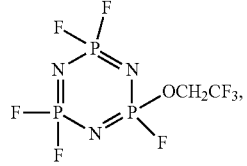
Formula 2-6

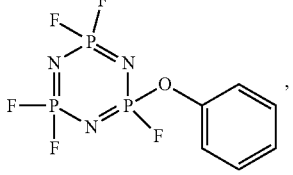
Formula 2-7

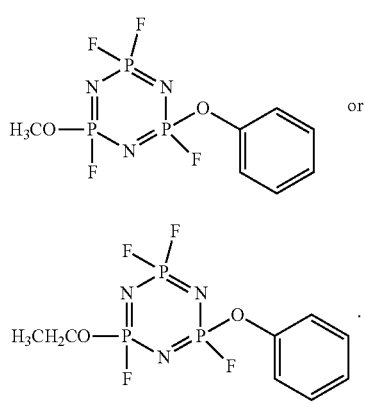

Formula 2-8

Formula 2-9

In some embodiments, the weight percentage of the phosphazene compound in the electrolyte is about 0.1%-about 10% based on a total weight of the electrolyte. In some embodiments, the weight percentage of the phosphazene compound in the electrolyte is about 0.1%-about 1%, about 0.1%-about 5%, about 1%-about 5%, about 1%-about 3%, about 3%-about 5%, about 1%-about 10%, about 5%-about 10% or the like, based on a total weight of the electrolyte.

In some embodiments, the weight percentage of the fluorine-containing phosphate ester and the phosphazene compound in the electrolyte is about 0.1%-about 10% based on a total weight of the electrolyte.

In some embodiments, the weight percentage of the boron compound and the phosphazene compound is about 0.1%-about 10% based on a total weight of the electrolyte.

In some embodiments, the electrolyte of the present application further includes a lithium salt that may be selected from at least one of lithium hexafluorophosphate ($LiPF_6$), lithium tetrafluoroborate ($LiBF_4$), lithium difluorophosphate ($LiPO_2F_2$), lithium bis(trifluoromethanesulphonyl)imide $LiN(CF_3SO_2)_2$ or lithium bis(fluorosulfonyl)imide $Li(N(SO_2F)_2)$. The concentration of the lithium salt may be about 0.3 mol/L-about 2.5 mol/L, for example, about 0.3 mol/L-about 0.8 mol/L, about 0.5 mol/L-about 1.5 mol/L, about 0.8 mol/L-about 1.3 mol/L, about 1.0 mol/L-about 2 mol/L or the like.

In some embodiments, the electrolyte of the present application further includes an organic solvent that is selected from at least one of ethylene carbonate, propylene carbonate, dimethyl carbonate, diethyl carbonate, methyl ethyl carbonate, and γ-butyrolactone.

According to an embodiment of the present application, the present application provides an electrolyte including a fluorine-containing phosphate ester and a carboxylate ester. The fluorine-containing phosphate ester works together with the carboxylate ester to reduce the gas production of the electrochemical device, thereby improving the high-temperature storage performance and safety performance of the electrochemical device, and ensuring a better kinetic performance of the electrochemical device.

According to an embodiment of the present application, the present application further provides an electrolyte including a fluorine-containing phosphate ester, a carboxylate ester, and a phosphazene compound. The three compounds work together to effectively increase the safety of the electrolyte when an internal short-circuit occurs in the electrochemical device and a large amount of heat is released causing the cathode and anode to be out of control.

According to an embodiment of the present application, the present application further provides an electrolyte including a fluorine-containing phosphate ester, a carboxylate ester, and a boron compound. The three compounds work together to reduce damage caused by the fluorine-containing phosphate ester to the cathode and anode interfaces, and improve the cycle performance of the electrochemical device.

According to an embodiment of the present application, the present application further provides an electrolyte including a fluorine-containing phosphate ester, a carboxylate ester, a boron compound and a phosphazene compound. The four compounds work together to improve the cycle performance of the electrochemical device.

II. Electrochemical Device

The electrochemical device of the present application may include any device in which an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application includes a cathode having a cathode active material capable of absorbing and releasing metal ions; an anode having an anode active material capable of absorbing and releasing metal ions; and an electrolyte of the present application.

Electrolyte

The electrolyte used in the electrochemical device of the present application is any of the aforementioned electrolytes according to the present application. Moreover, the electrolyte used in the electrochemical device of the present application may include other electrolytes falling within the scope of present application.

Cathode

The cathode used in the electrochemical device of the present application includes a cathode current collector and a cathode active material layer coated on at least one surface of the cathode current collector. The cathode active material layer includes a cathode active material.

The inventors of the present application found that when the combination of the particles of the cathode, the adsorption capacity for the electrolyte and the composition of the cathode-electrolyte interface (CEI) layer formed on the surface of the cathode meet a specific relationship, the kinetic and safety performances of the battery can be improved while flame retardancy is ensured. A suitable combination of particles can ensure the wettability by the electrolyte. Where the cathode active material particles are large, the wettability of the electrolyte is poor, the kinetic performance of the battery is low, and there are no sufficient P or F radicals in the CEI layer to capture O and other free radicals released by the cathode. The particle size of the cathode active material affects the coating quality of the cathode slurry. As the small particles increase, the side reactions of the electrolyte on the cathode active material particles increase, which is detrimental to high temperature performance.

In some embodiments, the electrochemical device meets $2.7 \leq W \leq 8.0$, wherein W is a parameter of the electrochemical device, and $W=(D90-D10)/D50+Cw/D50+D\times14R/10000$. D10 (μm) is a numerical value of the particle size when the cumulative volume percentage of the cathode active material reaches 10%. D90 (μm) is a numerical value of the particle size when the cumulative volume percentage of the cathode active material reaches 90%. D50 (μm) is a numerical value of the particle size when the cumulative volume percentage of the cathode active material reaches 50%. D10 (μm), D90 (μm) and D50 (μm) are both measured by a laser particle size analyzer. Cw (mg/cm$^2$) is a numerical value of the weight of the cathode active material layer per unit area, which is measured by an electronic balance. D (g/cm$^3$) is a numerical value of the compacted density of the cathode, that is, the weight of the cathode active material layer per unit area divided by the thickness of the cathode active material layer. R (g/cm$^3$) is a numerical value of the density of the electrolyte, which is tested by a liquid density meter.

In some embodiments, W is in the range of about 2.7-about 3.55, about 2.7-about 3.81, about 3.0-about 4.0, about 3.0-about 5.0, about 2.7-about 5.0, about 3.0-about 6.0 or the like.

In some embodiments, D10 (μm) is in the range of about 2.0 (μm)-about 8.0 (μm), for example, about 2.0 (μm)-about 5.0 (μm), about 5.0 (μm)-about 8.0 (μm), about 3.2 (μm)-about 6.5 (μm) or the like.

In some embodiments, D50 is in the range of about 5.0 (μm)-about 18.0 (μm), for example, about 5.0 (μm)-about 10.0 (μm), about 10.0 (μm)-about 15.0 (μm), about 10.0 (μm)-about 18.0 (μm), about 8.7 (μm)-about 15.5 (μm) or the like.

In some embodiments, D90 (μm) is in the range of about 18.0 (μm)-about 35.0 (μm), for example, about 18.0 (μm)-about 20.0 (μm), about 20.0 (μm)-about 30.0 (μm), about 20.0 (μm)-about 35.0 (μm), about 22.7 (μm)-about 30.5 (μm) or the like.

In some embodiments, (D90-D10)/D50 is in the range of about 0.3-about 6.0, for example, about 0.3-about 1.0, about 0.3-about 3.0, about 1.0-about 3.0, about 1.0-about 6.0, about 0.8-about 4.3 or the like.

In some embodiments, D (g/cm$^3$) is in the range of about 3.8 (g/cm$^3$)-about 4.3 (g/cm$^3$), for example, about 4.0 (g/cm$^3$)-about 4.3 (g/cm$^3$), about 4.05 (g/cm$^3$)-about 4.25 (g/cm$^3$) or the like.

In some embodiments, R (g/cm$^3$) is in the range of about 0.7 (g/cm$^3$)-about 1.5 (g/cm$^3$), for example, about 1.0 (g/cm$^3$)-about 1.2 (g/cm$^3$).

The cathode may also include a binder. In order to achieve a high compacted density of the cathode, the binder includes polyvinylidene fluoride having a large molecular weight and a wide molecular weight distribution. In some embodiments, the weight average molecular weight Mw of polyvinylidene fluoride is greater than 70W. In some embodiments, the molecular weight distribution Mw/Mn of polyvinylidene fluoride is greater than 1.8, and both Mw and Mn are measured by gel permeation chromatography. The wide molecular weight distribution allows a certain amount of small molecule polyvinylidene fluoride to increase, which weakens the intermolecular van der Waals force and plays a role in plasticization, whereby a cathode active material having high compacted density can be obtained.

In some embodiments, the cathode active material includes at least one of lithium cobalt oxide, lithium nickel oxide, lithium manganese oxide, lithium nickel cobalt manganese composite oxide, or lithium metal phosphate.

In some embodiments, the lithium nickel oxide is represented by the general formula LiNi$_{1-y}$M$_y$O$_2$, wherein M includes at least one of Co, Al, Cu, Fe, Mg, B, Cr, Zn, Mn or Ga, and 0.01≤y≤0.7.

In some embodiments, the lithium nickel cobalt manganese composite oxide is represented by Li$_{1+z}$Ni$_b$Mn$_c$Co$_{1-(b+c+d)}$A$_d$O$_{(2-e)}$C$_e$, wherein −0.5≤z≤0.5, 0.1≤b≤0.8, 0.1≤c≤0.8, 0≤d≤0.2, 0≤e≤0.2, and b+c+d<1, A is selected from at least one of Al, Mg, Cr, Ti, Si or Y, and C is selected from at least one of F, P, or Cl.

In some embodiments, the lithium metal phosphate is represented by Li$_{1+x}$M"$_{1-y}$M'$_y$PO$_{4-z}$X$_z$, wherein M" is selected from at least one of Fe, Mn, Co or Ni, M' is selected from at least one of Al, Mg or Ti, X is selected from at least one of F, S, or N, −0.5≤x≤+0.5, 0≤y≤0.5, and 0≤z≤0.1.

In some embodiments, the weight ratio of lithium cobalt oxide to lithium nickel cobalt aluminum composite oxide is 9:1-1:9.

In some embodiments, the weight ratio of lithium cobalt oxide to lithium nickel cobalt aluminum composite oxide is 2:8-8:2.

In some embodiments, the weight ratio of lithium cobalt oxide to lithium nickel cobalt aluminum composite oxide is 3:7-7:3.

Anode

The anode used in the electrochemical device of the present application includes an anode active material layer including an anode active material. The specific types of the anode active material are not particularly limited, and may be selected as desired. Particularly, the anode active material is selected from at least one of lithium metal, structured lithium metal, natural graphite, artificial graphite, mesocarbon microbead (MCMB), hard carbon, soft carbon, silicon, silicon-carbon composite, Li—Sn alloy, Li—Sn—O alloy, Sn, SnO, SnO$_2$, lithiated TiO$_2$—Li$_4$Ti$_5$O$_{12}$ having a spinel structure or Li—Al alloy.

In some embodiments, the electrochemical device is a lithium ion secondary battery. In order to prevent inadvertent lithium plating on the anode during charging, the electrochemical equivalent of the anode material capable of inserting and extracting lithium ions is preferably greater than the electrochemical equivalent of the cathode. Therefore, the amounts of cathode active material and anode active material need to be adjusted accordingly to obtain a high energy density. In some embodiments, the ratio of anode capacity to cathode capacity can be about 1.01-about 1.2.

Separator

In some embodiments, the electrochemical device of the present application is provided with a separator between the cathode and the anode to prevent a short circuit. The material and shape of the separator used in the electrochemical device of the present application are not particularly limited, and may be any of the techniques disclosed in the prior art. In some embodiments, the separator includes a polymer or an inorganic substance or the like formed of a material which is stable against the electrolyte of the present application.

For example, the separator may include a substrate layer and a surface treatment layer. The substrate layer is a non-woven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, and a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer includes inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, boehmite, aluminum hydroxide, magnesium hydroxide, calcium hydroxide and barium sulfate, or a combination of more than one thereof. The binder is selected from at least one of polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof. The polymer layer contains a polymer, and the material of the polymer includes at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

In some embodiments, the present application provides a lithium ion battery, which includes a cathode, an anode, a separator and an electrolyte, wherein the electrolyte is any electrolyte as described above in the present application.

In some embodiments, the present application further provides a lithium ion battery, which includes a cathode, an anode, a separator disposed between the cathode and the anode, an electrolyte and a packaging foil. The cathode includes a cathode current collector, and a cathode film layer coating on the cathode current collector. The anode includes an anode current collector, and an anode film layer coated on the anode current collector. The electrolyte is any electrolyte as described above in the present application.

III. Examples

The performance evaluation of the lithium ion batteries in the examples and comparative examples of the present application is described below.

Preparation of Lithium-Ion Battery (1) Preparation of electrolyte: In a glove box under an argon atmosphere having a moisture content of <10 ppm, ethylene carbonate, propylene carbonate, and diethyl carbonate were mixed uniformly at a weight ratio of 1:1:1, and then lithium hexafluorophosphate was added and stirred until uniform, to form a basic electrolyte, wherein the concentration of lithium hexafluorophosphate was 1.15 mol/L. Different amounts of materials shown in Tables below were added to the basic electrolyte to obtain the electrolytes of the various examples and comparative examples. The contents of each substance in the electrolyte described below were calculated based on a total weight of the electrolyte.

(2) Preparation of cathode: Lithium cobalt oxide, carbon nanotubes, polyvinylidene fluoride (having a weight average molecular weight Mw of 85 W, and a molecular weight distribution Mw/Mn of 2.0) were mixed at a weight ratio of 95:2:3. Then N-methylpyrrolidone was added and stirred until uniform by a vacuum mixer to obtain a cathode slurry. The cathode slurry was evenly coated on an aluminum foil as a cathode current collector, dried at 85° C., then cold-pressed, cut, sliced, and then dried for 4 h at 85° C. under vacuum to obtain the cathode.

(3) Preparation of anode: Graphite, styrene-butadiene rubber, and carboxymethylcellulose sodium were mixed fully at a weight ratio of 95:2:3 by stirring in a suitable amount of deionized water as a solvent, to form a uniform anode slurry. The slurry was applied to a Cu foil as an anode current collector, dried, and cold pressed to obtain an anode.

(4) Separator: The separator was a polyethylene film.

(5) Preparation of lithium ion battery: The cathode, the separator, and the anode were laminated in order such that the separator was placed between and served to separate the cathode and the anode. Then, the system was wound up, and placed in an outer packaging foil. The electrolyte prepared above was injected into the dried battery, and after vacuum packaging, standing, formation, shaping, and other procedures, the preparation of the lithium ion battery was completed.

Test Methods

The electrolytes and lithium ion batteries of various examples and comparative examples were prepared as described above, and the lithium ion batteries were subjected to the following tests.

(1) Test of Self-Extinguishing Time (SET) of Electrolyte 1 mm-thick ceramic fiber paper was cut into a disc shape and dried in a thermostatic oven. The dried ceramic fiber paper was hooked to a copper wire, and a certain quality (m) of electrolyte was weighed and dropped on the disc-shaped ceramic fiber paper. The ceramic fiber paper with the electrolyte was ignited by an impulse portfire, and the time t from the withdrawal of the ignition source to the extinguishing of the fiber paper was recorded. The flame retardancy of the electrolyte was measured by the self-extinguishing time (SET) and calculated by the formula: $SET=t/m$.

(2) High-Temperature Storage Performance Test

The lithium ion battery was allowed to stand at 25° C. for 30 minutes, charged to 4.45 V at a constant current of 0.5 C and then charged to 0.05 C at a constant voltage of 4.45 V, and allowed to stand for 5 minutes. The thickness of the lithium ion battery was measured and recorded as h0. Then, the lithium ion battery was stored for 24 days in a thermostatic oven at 85° C. The thickness of the lithium ion battery was measured and recorded as h1. The thickness expansion rate of the lithium ion battery was calculated by the following formula: thickness expansion rate $(\%)=(h1-h0)/h0 \times 100\%$.

(3) Test of Capacity Retention Rate at Room Temperature

At 25° C., the lithium ion battery was charged to 4.45 V at a constant current of 0.7 C and then charged to a current of 0.05 C at a constant voltage, and discharged to 3.0 V at a constant current of 1 C. This was the first cycle, and multiple cycles were performed on the battery under the above conditions. The capacity of the first discharge was taken as 100%. The charge/discharge cycle was repeated, and when the discharge capacity was decreased to 80%, the test was stopped, and the number of cycles was recorded and used as an index for evaluating the cycle performance of the lithium ion battery.

(4) Test of Capacity Retention Rate at High Temperature

At 45° C., the lithium ion battery was charged to 4.45 V at a constant current of 0.7 C and then charged to a current of 0.05 C at a constant voltage, and discharged to 3.0 V at a constant current of 1 C. This was the first cycle, and multiple cycles were performed on the battery under the above conditions. The capacity of the first discharge was taken as 100%. The charge/discharge cycle was repeated, and when the discharge capacity was decreased to 80%, the test was stopped, and the number of cycles was recorded and used as an index for evaluating the cycle performance of the lithium ion battery.

(5) Nail Penetration Test

Pretreatment of lithium ion battery: At room temperature, the lithium ion battery was discharged to 3.0 V at 0.5 C, stood for 5 minutes, charged to a voltage of 4.45 V at a constant current of 0.5 C, and then charged to a current of 0.05 C at a constant voltage of 4.45 V. Before the test, the open circuit voltage (OCV) and impedance (IMP) were recorded, and the appearance was examined and photographed.

Nail penetration test: A nail with a diameter of 2.5 mm was penetrated into the center of the lithium ion battery at a penetration speed of 100 mm/s and retained for 30 minutes. The OCV and the surface temperature of the lithium ion battery were monitored during the test process, and the test was stopped after 5 minutes or after the surface temperature of the lithium ion battery dropped to 50° C. After the test was completed, the OCV and IMP after the test were recorded, and the appearance examined and photographed. Whether the lithium ion battery burns or explodes was used as an indicator of the safety performance. The sample number for each group of evaluations was 10, and the number of lithium-ion batteries that passed the test was recorded.

Test Results

Table 1 shows the influence of the amounts of the fluorine-containing phosphate ester and the carboxylate ester in the electrolyte on the performance of lithium-ion batteries.

By comparing Examples S1-1 to S1-10 with Comparative Examples D1-4 to D1-7, it can be seen that with the combination of the fluorine-containing phosphate ester and the carboxylate ester at a weight ratio of 0.001-0.5, the cycle performance of lithium ion batteries at room temperature is significantly improved. This may be because the combination of the carboxylate ester and the fluoride-containing phosphate ester can improve the kinetic performance of lithium-ion batteries. To a certain extent, the carboxylate ester makes up for the degradation caused by the fluoride-containing phosphate ester to the kinetic performance of lithium-containing batteries, and inhibits lithium plating on the anode; and also the polarization of the lithium-ion battery system is reduced, and the consumption rate of the electrolyte is reduced to a certain extent, thereby ensuring the good cycle performance at room temperature of the battery.

By comparing Examples S1-11 and S1-12 with Comparative Examples D1-9 and D1-11, it can be found that other types of fluoride-containing phosphate esters, such as Formula 1-4 and Formula 1-6, can also improve the cycle performance of lithium ion batteries.

TABLE 1

| Sample | Parameter W | Fluorine-containing phosphate ester | Carboxylate ester | Weight ratio of fluorine-containing phosphate ester to carboxylate ester | SET (s/g) | Cycles at 25° C. | Cycles at 45° C. | Thickness expansion rate after storage at 85° C. | Nail penetration test passing rate |
|---|---|---|---|---|---|---|---|---|---|
| D1-1 | 3.19 | 0 | 0 | 0 | 120 | 460 | 380 | 25% | 2/10 |
| D1-2 | 3.19 | 0 | 10% EP + 10% PP | 0 | 123 | 501 | 405 | 34% | 1/10 |
| D1-3 | 3.19 | 0 | 30% EP + 10% PP | 0 | 122 | 490 | 395 | 45% | 2/10 |
| D1-4 | 3.19 | 1% Formula 1-1 | 0 | / | 114 | 430 | 335 | 12% | 2/10 |
| D1-5 | 3.19 | 3% Formula 1-1 | 0 | / | 99 | 420 | 320 | 9% | 3/10 |
| D1-6 | 3.19 | 5% Formula 1-1 | 0 | / | 80 | 400 | 300 | 6% | 5/10 |
| D1-7 | 3.19 | 10% Formula 1-1 | 0 | / | 55 | 200 | 150 | 5% | 6/10 |
| D1-8 | 3.19 | 3% Formula 1-4 | 0 | / | 100 | 410 | 310 | 13% | 3/10 |
| D1-9 | 3.19 | 5% Formula 1-4 | 0 | / | 80 | 395 | 300 | 11% | 4/10 |
| D1-10 | 3.19 | 3% Formula 1-6 | 0 | / | 103 | 405 | 305 | 15% | 2/10 |
| D1-11 | 3.19 | 5% Formula 1-6 | 0 | / | 82 | 380 | 298 | 13% | 4/10 |
| S1-1 | 3.19 | 0.1% Formula 1-1 | 10% EP + 10% PP | 0.005 | 115 | 505 | 410 | 27% | 2/10 |
| S1-2 | 3.19 | 0.5% Formula 1-1 | 10% EP + 10% PP | 0.025 | 114 | 503 | 407 | 23% | 2/10 |
| S1-3 | 3.19 | 1% Formula 1-1 | 10% EP + 10% PP | 0.05 | 113 | 510 | 420 | 23% | 3/10 |
| S1-4 | 3.19 | 3% Formula 1-1 | 10% EP + 10% PP | 0.15 | 97 | 504 | 405 | 18% | 4/10 |
| S1-5 | 3.19 | 5% Formula 1-1 | 10% EP + 10% PP | 0.25 | 75 | 512 | 420 | 14% | 6/10 |
| S1-6 | 3.19 | 7% Formula 1-1 | 10% EP + 10% PP | 0.35 | 84 | 460 | 370 | 18% | 7/10 |
| S1-7 | 3.19 | 1% Formula 1-1 | 30% EP + 10% PP | 0.05 | 112 | 600 | 495 | 34% | 3/10 |
| S1-8 | 3.19 | 3% Formula 1-1 | 30% EP + 10% PP | 0.15 | 96 | 570 | 469 | 27% | 4/10 |
| S1-9 | 3.19 | 5% Formula 1-1 | 30% EP + 10% PP | 0.125 | 70 | 550 | 445 | 19% | 6/10 |
| S1-10 | 3.19 | 10% Formula 1-1 | 30% EP + 10% PP | 0.25 | 45 | 400 | 310 | 17% | 7/10 |
| S1-11 | 3.19 | 5% Formula 1-4 | 30% EP + 10% PP | 0.125 | 80 | 530 | 420 | 25% | 6/10 |
| S1-12 | 3.19 | 5% Formula 1-6 | 30% EP + 10% PP | 0.125 | 82 | 510 | 400 | 27% | 6/10 |

Table 2 shows the influence of a boron compound added to the electrolyte on the performance of lithium-ion batteries on the basis of the electrolyte including the fluorine-containing phosphate ester and the carboxylate ester.

TABLE 2

| Sample | Parameter W | Fluorine-containing phosphate ester | Carboxylate ester | Boron compound | SET (s/g) | Cycles at 25° C. | Cycles at 45° C. | Nail penetration test passing rate |
|---|---|---|---|---|---|---|---|---|
| S1-10 | 3.19 | 10% Formula 1-1 | 30% EP + 10% PP | 0 | 45 | 400 | 310 | 7/10 |
| S2-1 | 3.19 | 10% Formula 1-1 | 30% EP + 10% PP | 0.3% Formula 3-1 | 44 | 580 | 500 | 7/10 |
| S2-2 | 3.19 | 10% Formula 1-1 | 30% EP + 10% PP | 0.5% Formula 3-1 | 45 | 595 | 515 | 7/10 |
| S2-3 | 3.19 | 10% Formula 1-1 | 30% EP + 10% PP | 0.3% Formula 3-2 | 45 | 600 | 510 | 7/10 |
| S2-4 | 3.19 | 10% Formula 1-1 | 30% EP + 10% PP | 0.3% Formula 3-6 | 45 | 587 | 495 | 7/10 |
| S2-5 | 3.19 | 10% Formula 1-3 | 30% EP + 10% PP | 0.5% Formula 3-1 | 50 | 589 | 505 | 6/10 |

As shown in Table 2, by comparing Examples S2-1 and S2-2 with Example S1-10, it can be known that the addition of the boron compound of Formula 3-1 can further improve the cycle performance of the lithium ion battery at 25° C. and 45° C. This may be because the boron compound can inhibit the destruction of the fluoride-containing phosphate ester on the cathode and anode interfaces. The addition of boron compounds can improve cycle performance at room temperature and at high temperatures of the lithium ion batteries while ensuring good safety performance during high temperature storage and abuse tests.

It can also be seen from the test results of Examples S2-3 and S2-4 that other boron compounds with a similar structure to Formula 3-1 (for example, Formula 3-2 and Formula 3-6) also have similar effects and therefore the electrolyte including the fluorine-containing phosphate ester, the carboxylate ester and the boron compound demonstrates excellent safety performance and balanced electrochemical performance.

Table 3 shows the influence of a phosphazene compound added to the electrolyte on the performance of lithium-ion batteries on the basis of the electrolyte including the fluorine-containing phosphate ester and the carboxylate ester.

TABLE 3

| Sample | Parameter W | Fluorine-containing phosphate ester | Carboxylate ester | Phosphazene compound | SET (s/g) | Cycles at 25° C. | Cycles at 45° C. | Nail penetration test passing rate |
|---|---|---|---|---|---|---|---|---|
| S1-10 | 3.19 | 10% Formula 1-1 | 30% EP + 10% PP | 0 | 45 | 400 | 310 | 7/10 |
| S3-1 | 3.19 | 5% Formula 1-1 | 30% EP + 10% PP | 1% Formula 2-1 | 60 | 530 | 420 | 6/10 |
| S3-2 | 3.19 | 5% Formula 1-1 | 30% EP + 10% PP | 3% Formula 2-1 | 40 | 535 | 419 | 7/10 |
| S3-3 | 3.19 | 5% Formula 1-1 | 30% EP + 10% PP | 5% Formula 2-1 | 0 | 530 | 407 | 8/10 |
| S3-4 | 3.19 | 3% Formula 1-1 | 30% EP + 10% PP | 5% Formula 2-1 | 0 | 600 | 480 | 8/10 |
| S3-5 | 3.19 | 3% Formula 1-1 | 30% EP + 10% PP | 3% Formula 2-1 | 50 | 545 | 430 | 6/10 |
| S3-6 | 3.19 | 4% Formula 1-1 | 30% EP + 10% PP | 3% Formula 2-1 | 45 | 540 | 425 | 7/10 |
| S3-7 | 3.19 | 3% Formula 1-1 | 30% EP + 10% PP | 4% Formula 2-1 | 20 | 610 | 490 | 8/10 |
| S3-8 | 3.19 | 2% Formula 1-1 | 30% EP + 10% PP | 4% Formula 2-1 | 25 | 620 | 500 | 8/10 |
| S3-9 | 3.19 | 5% Formula 1-1 | 30% EP + 10% PP | 5% Formula 2-6 | 0 | 495 | 387 | 9/10 |

By comparing Examples S3-1 to S3-7 with Example S1-10, it can be seen that the addition of the phosphazene compound of Formula 2-1 can reduce the flammability of the electrolyte, and the nail penetration test passing rate of the lithium ion battery is improved to a certain extent.

By comparing Examples S3-4 and S3-3, it can be known that on the basis of Example S3-3, when the amount of the fluoride-containing phosphate ester of Formula 1-1 is reduced, the SET of the electrolyte is still 0, and the cycle performance of the lithium-ion battery is further improved. This indicates that the phosphazene compound contributes more to the flame retardancy of the electrolyte than the fluorine-containing phosphate ester, and causes less degradation to electrical performance, thus being of great practicality. In addition, the phosphazene compound of Formula 2-1 has a lower oxidation potential, which strengthens protection of the cathode and reduces damage to the cathode by the compound of Formula 1-1, so the electrical performance of the lithium ion battery can be further improved.

Tables 4 and 5 show the influence of a boron compound and a phosphazene compound added to the electrolyte on the performance of lithium-ion batteries on the basis of the electrolyte including the fluorine-containing phosphate ester and the carboxylate ester. Table 6 shows the particle diameters (D10, D50, and D90) of the cathode materials, the coating weight Cw per unit area, the compacted density D, and the density R of the electrolyte in Examples S4-1 to S4-13.

TABLE 4

| Sample | Parameter W | Fluorine-containing phosphate ester | Carboxylate ester | Ratio of fluorine-containing phosphate ester to carboxylate ester | Phosphazene compound | Boron compound |
|---|---|---|---|---|---|---|
| S1-5 | 3.19 | 5% Formula 1-1 | 10% EP + 10% PP | 0.25 | 0 | 0 |
| S4-1 | 3.19 | 5% Formula 1-1 | 30% EP + 10% PP | 0.125 | 0 | 0 |
| S4-2 | 3.19 | 5% Formula 1-1 | 10% EP + 10% PP | 0.25 | 5% Formula 2-1 | 0 |
| S4-3 | 3.19 | 5% Formula 1-1 | 30% EP + 10% PP | 0.125 | 5% Formula 2-1 | 0 |
| S4-4 | 3.19 | 3% Formula 1-1 | 10% EP + 10% PP | 0.15 | 5% Formula 2-1 | 0.3% Formula 3-1 |
| S4-5 | 3.19 | 5% Formula 1-1 | 10% EP + 10% PP | 0.25 | 5% Formula 2-1 | 0.3% Formula 3-1 |
| S4-6 | 3.19 | 3% Formula 1-1 | 30% EP + 10% PP | 0.125 | 5% Formula 2-1 | 0.3% Formula 3-1 |
| S4-7 | 3.19 | 5% Formula 1-1 | 30% EP + 10% PP | 0.125 | 5% Formula 2-1 | 0.3% Formula 3-5 |
| S4-8 | 2.99 | 3% Formula 1-1 | 30% EP + 10% PP | 0.125 | 5% Formula 2-1 | 0.3% Formula 3-1 |
| S4-9 | 3.76 | 3% Formula 1-1 | 30% EP + 10% PP | 0.125 | 5% Formula 2-1 | 0.3% Formula 3-1 |
| S4-10 | 4.91 | 5% Formula 1-1 | 30% EP + 10% PP | 0.125 | 5% Formula 2-1 | 0.3% Formula 3-5 |
| S4-11 | 6.14 | 3% Formula 1-1 | 30% EP + 10% PP | 0.125 | 5% Formula 2-1 | 0.3% Formula 3-1 |
| S4-12 | 2.42 | 3% Formula 1-1 | 30% EP + 10% PP | 0.125 | 5% Formula 2-1 | 0.3% Formula 3-1 |

TABLE 5

| Sample | SET (s/g) | Cycles at 25° C. | Cycles at 45° C. | Thickness expansion rate after storage at 85° C. | Nail penetration test passing rate |
|---|---|---|---|---|---|
| S1-5 | 75 | 512 | 420 | 14% | 6/10 |
| S4-1 | 70 | 550 | 445 | 19% | 5/10 |
| S4-2 | 0 | 500 | 385 | 15% | 9/10 |
| S4-3 | 0 | 570 | 430 | 20% | 8/10 |
| S4-4 | 0 | 650 | 570 | 15% | 8/10 |
| S4-5 | 0 | 635 | 555 | 13% | 9/10 |
| S4-6 | 0 | 720 | 650 | 20% | 8/10 |
| S4-7 | 0 | 700 | 630 | 18% | 8/10 |
| S4-8 | 0 | 690 | 595 | 27% | 7/10 |
| S4-9 | 0 | 700 | 620 | 22% | 7/10 |
| S4-10 | 0 | 670 | 580 | 25% | 7/10 |
| S4-11 | 0 | 630 | 540 | 24% | 8/10 |
| S4-12 | 0 | 580 | 430 | 38% | 6/10 |

TABLE 6

| Sample | D10 (μm) | D50 (μm) | D90 (μm) | Cw (mg/cm²) | D (g/cm³) | R (g/cm³) |
|---|---|---|---|---|---|---|
| S1-5 | 4.4 | 14.6 | 28.8 | 22.08 | 4.10 | 1.1 |
| S4-1 | 4.4 | 14.6 | 28.8 | 22.08 | 4.10 | 1.1 |
| S4-2 | 4.4 | 14.6 | 28.8 | 22.08 | 4.10 | 1.1 |
| S4-3 | 4.4 | 14.6 | 28.8 | 22.08 | 4.10 | 1.1 |
| S4-4 | 4.4 | 14.6 | 28.8 | 22.08 | 4.10 | 1.1 |
| S4-5 | 4.4 | 14.6 | 28.8 | 22.08 | 4.10 | 1.1 |
| S4-6 | 4.4 | 14.6 | 28.8 | 22.08 | 4.10 | 1.1 |
| S4-7 | 4.4 | 14.6 | 28.8 | 22.08 | 4.10 | 1.1 |
| S4-8 | 4.0 | 14.0 | 23.74 | 22.08 | 4.10 | 1.1 |
| S4-9 | 3.8 | 12.2 | 27.5 | 22.08 | 4.10 | 1.1 |
| S4-10 | 3.0 | 10.0 | 30.0 | 22.08 | 4.10 | 1.1 |
| S4-11 | 3.0 | 8.0 | 30.0 | 22.08 | 4.10 | 1.1 |
| S4-12 | 6 | 12 | 13 | 22.08 | 4.10 | 1.1 |

As shown in Tables 4 and 5, the addition of two types of flame retardants, i.e. the fluorine-containing phosphate ester (for example, Formula 1-1) and the phosphazene compound (for example, Formula 2-1) can reduce the flammability of the electrolyte to 0. This indicates that the electrolyte is non-flammable, thus significantly improving the safety performance of lithium-ion batteries. In addition, the nail penetration test passing rate of lithium ion batteries is also significantly improved. By adding the boron compound and adjusting the content of the carboxylate ester in the electrolyte, both the safety performance and the electrochemical performance of lithium ion batteries are improved.

Examples S4-8 to S4-12 in Table 4 show the influence of the parameter W on the performance of lithium ion batteries. By comparing Examples S4-8 and S4-6, it can be known that as the parameter W of the lithium ion battery is different (wherein the particle size and distribution of the cathode active material are adjusted), the measured electrochemical performance also varies significantly. Compared with Example S4-6, the cathode in Example S4-8 has more small particles, and the value of the parameter W declines, resulting in a corresponding increase in the thickness expansion rate after high-temperature storage at 85° C. of the lithium ion battery. This is mainly because as the small particles increase, the contact area between the cathode and the electrolyte increases, and the side reactions at high temperature will increase accordingly.

Table 7 shows the circumstances where the electrolytes according to the present application are used with different cathode materials.

TABLE 7

| Sample | Cathode material | Fluorine-containing phosphate ester | Carboxylate ester | Thickness expansion rate after storage at 85° C. |
|---|---|---|---|---|
| D1-2 | LiCoO₂ | 0 | 10% EP + 10% PP | 34% |
| S5-2 | LiCoO₂ | 1% Formula 1-1 | 10% EP + 10% PP | 23% |
| S5-3 | NCM523 | 0 | 10% EP + 10% PP | 39% |
| S5-4 | NCM523 | 1% Formula 1-1 | 10% EP + 10% PP | 22% |
| S5-5 | NCM622 | 1% Formula 1-1 | 10% EP + 10% PP | 25% |
| S5-6 | 70% NCM523 + 30% LiCoO₂ | 0 | 10% EP + 10% PP | 34% |
| S5-7 | 70% NCM523 + 30% LiCoO₂ | 1% Formula 1-1 | 10% EP + 10% PP | 19% |
| S5-8 | 70% NCM622 + 30% LiCoO₂ | 1% Formula 1-1 | 10% EP + 10% PP | 23% |

As can be seen from Table 7, in addition to the lithium cobalt oxide system, when used with a ternary system or a ternary system combined with lithium cobalt oxide, the electrolyte including the fluoride-containing phosphate ester and the carboxylate ester still has improved high-temperature storage performance. This may be because the fluorine-containing phosphate ester can fix the reactive oxygen in the cathode material, thereby reducing the reaction of the cathode material with the electrolyte, so as to achieve the purpose of alleviating bulging during high-temperature storage.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising: a cathode, having a cathode active material layer comprising a cathode active material; an anode, having an anode active material layer comprising an anode active material; and an electrolyte, wherein the electrolyte comprises a fluorine-containing phosphate ester and a carboxylate ester, wherein the fluorine-containing phosphate ester is represented by Formula 1:

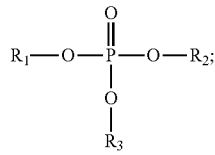

Formula 1 wherein $R_1$, $R_2$ and $R_3$ are each independently selected from hydrogen, a $C_1$-$C_{10}$ alkyl group, $C_1$-$C_{10}$ alkoxy group, $C_1$-$C_{10}$ haloalkyl group, $C_1$-$C_{10}$ haloalkoxy group, $C_1$-$C_{10}$ phosphate ester group, or $C_1$-$C_{10}$ mono- or multiple-carbonate ester group; wherein at least one of $R_1$, $R_2$ and $R_3$ comprises a fluorine atom, and wherein a ratio of the fluorine-containing phosphate ester to the carboxylate ester by weight is 0.025-0.25, wherein the electrochemical device meets $2.7 \leq (D90-D10)/D50+Cw/D50+D \times 14R/10000 \leq 8.0$, wherein D10 is a numerical value of the particle size of the cathode active material when the cumulative volume percentage of the cathode active material reaches 10%, D90 is a numerical value of the particle size of the cathode active material when the cumulative volume percentage of the cathode active material reaches 90%, D50 is a numerical value the particle size of the cathode active material when the cumulative volume percentage of the cathode active material reaches 50%, wherein D10, D90 and D50 are all expressed in μm, wherein Cw is a numerical value of the weight of the cathode active material layer per unit area, and expressed in mg/cm$^2$, wherein D is a numerical value of the compacted density of the cathode, and expressed in g/cm$^3$, and wherein R is a numerical value of the density of the electrolyte, and expressed in g/cm$^3$.

2. The electrochemical device according to claim 1, wherein the value of (D90-D10)/D50 is in the range of 0.3-6.0.

3. The electrochemical device according to claim 1, wherein value of the density R of the electrolyte is in the range of 0.7-1.5.

4. The electrochemical device according to claim 1, wherein the cathode comprises a binder including polyvinylidene fluoride having a molecular weight distribution Mw/Mn of greater than 1.8.

5. The electrochemical device according to claim 1, wherein the fluorine-containing phosphate ester comprises at least one of:

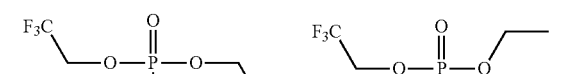

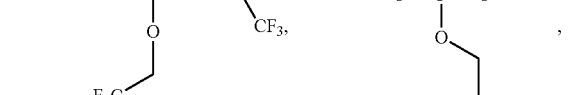

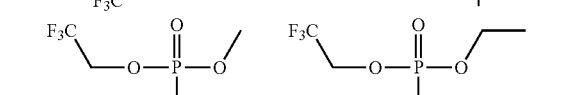

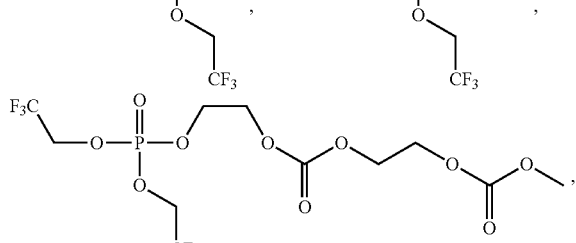

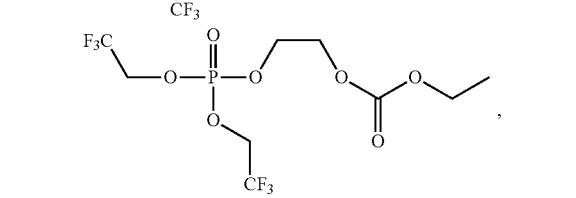

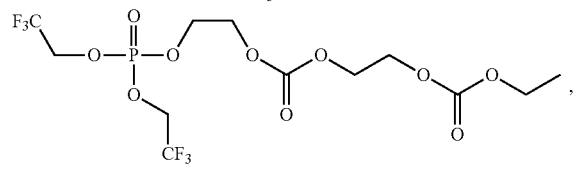

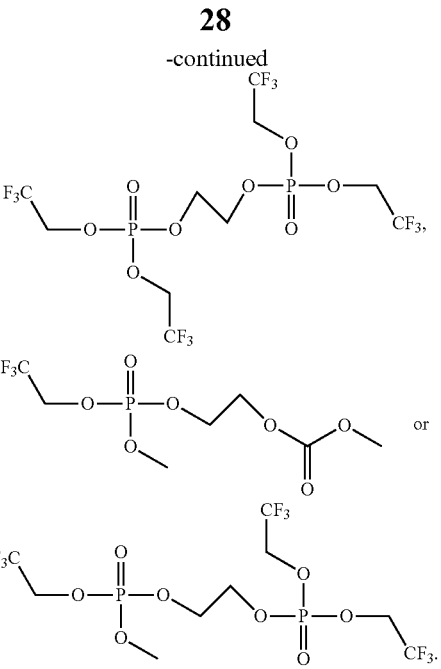

6. The electrochemical device according to claim 1, wherein the carboxylate ester comprises at least one of methyl propionate, ethyl acetate, ethyl propionate, propyl propionate, methyl butyrate, ethyl butyrate, propyl butyrate or butyl butyrate.

7. The electrochemical device according to claim 1, wherein the carboxylate ester comprises ethyl propionate ester; and a percentage of ethyl propionate ester by weight is 10%-90% of a total weight of the carboxylate ester.

8. The electrochemical device according to claim 1, wherein a percentage of the fluorine-containing phosphate ester by weight is 0.01%-10% of a total weight of the electrolyte.

9. The electrochemical device according to claim 1, wherein the electrolyte further comprises at least one of a boron compound or a phosphazene compound, wherein the boron compound comprises at least one of lithium bis(1,1-trifluoromethyloxalato)borate, lithium bis(1-trifluoromethyloxalato)borate, lithium difluoro(1,1-trifluoromethyloxalato)borate, lithium difluoro(oxalato)borate, lithium bis(oxalato)borate, lithium bis(1,1-trifluoromethylmalonato)borate, lithium fluoromalonato(difluoro)borate, or lithium bis(fluoromalonato)borate; and the phosphazene compound comprises at least one of:

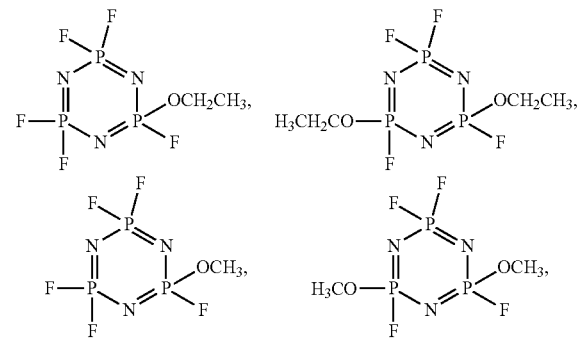

-continued
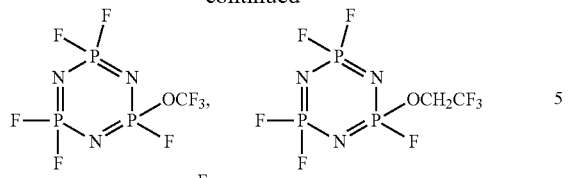
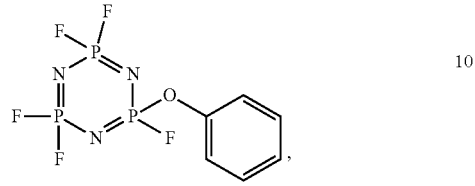
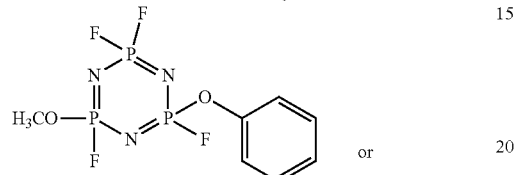
or
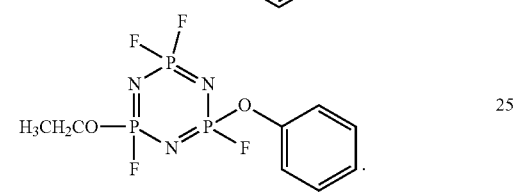
* * * * *